US011172426B2

(12) United States Patent
Chaponniere et al.

(10) Patent No.: US 11,172,426 B2
(45) Date of Patent: Nov. 9, 2021

(54) TECHNIQUES FOR ROUTING ID UPDATE

(71) Applicant: QUALCOMM Incorporated, San Diego, CA (US)

(72) Inventors: Lenaig Genevieve Chaponniere, La Jolla, CA (US); Anand Palanigounder, San Diego, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/592,518

(22) Filed: Oct. 3, 2019

(65) Prior Publication Data

US 2020/0112906 A1  Apr. 9, 2020

Related U.S. Application Data

(60) Provisional application No. 62/742,151, filed on Oct. 5, 2018.

(51) Int. Cl.
*H04W 8/26* (2009.01)
*H04W 40/24* (2009.01)
(Continued)

(52) U.S. Cl.
CPC ......... *H04W 40/248* (2013.01); *H04L 5/0055* (2013.01); *H04W 4/60* (2018.02);
(Continued)

(58) Field of Classification Search
CPC ..... H04W 40/248; H04W 4/60; H04W 8/245; H04W 8/26; H04W 60/04; H04L 5/0055
(Continued)

(56) References Cited

U.S. PATENT DOCUMENTS

2018/0139133 A1* 5/2018 Makhijani ........... H04W 60/005
2018/0192390 A1* 7/2018 Li ........................ H04W 8/065

OTHER PUBLICATIONS

Ericsson: "New Solution: Protected UE Configuration update Commands", 3GPP Draft; S3-180374, 3rd Generation Partnership Project (3GPP), Mobile Competence Centre, 650, Route Des Lucioles, F-06921 Sophia-Anti Polis Cedex, France, vol. SA WG3, No. Gothenburg, Sweden; 20180122-20180126 Jan. 26, 2018, XP051382725, Retrieved from the Internet: URL:http://www.3gpp.org/ftp/Meetings%5F3GPP%5FSYNC/SA3/Docs/ [retrieved on Jan. 26, 2018], 3 pages.

(Continued)

*Primary Examiner* — Joel Ajayi
(74) *Attorney, Agent, or Firm* — Patterson & Sheridan, LLP

(57) ABSTRACT

Certain aspects of the present disclosure relate to methods and apparatus for updating a routing ID associated with a user equipment in a wireless network. An exemplary method generally includes receiving a downlink control plane message including updated configuration information for a Unified Data Management (UDM) entity in the network; determining whether a universal subscriber identification module (USIM) of the UE supports one or more parameters stored in the USIM to be updated; based on the determination, storing the received configuration information in at least one of: the USIM if the USIM supports the one or more parameters to be updated; or memory of the UE if the USIM does not support the one or more parameters to be updated; generating an identifier for the UE based on the stored updated configuration information; and transmitting at least one message using the generated identifier.

33 Claims, 12 Drawing Sheets

(51) Int. Cl.
| | |
|---|---|
| H04W 8/24 | (2009.01) |
| H04L 5/00 | (2006.01) |
| H04W 4/60 | (2018.01) |
| H04W 60/04 | (2009.01) |
| H04W 88/02 | (2009.01) |
| H04W 84/04 | (2009.01) |
| H04W 72/04 | (2009.01) |

(52) U.S. Cl.
CPC ............. *H04W 8/245* (2013.01); *H04W 8/26* (2013.01); *H04W 60/04* (2013.01); *H04W 72/042* (2013.01); *H04W 84/042* (2013.01); *H04W 88/02* (2013.01)

(58) Field of Classification Search
USPC ........................................................ 455/466
See application file for complete search history.

(56) References Cited

OTHER PUBLICATIONS

Intel: "SoR Living Doc: Secure Packet Solution for Steering of Roaming", 3GPP Draft; S3-181703_SORUSINGSECUREPACKETSOLUTION_V2, 3rd Generation Partnership Project (3GPP), Mobile Competence Centre, 650, Route Des Lucioles, F-06921 Sophia-Anti Polis Cedex, France, vol. SA WG3, No. La Jolla (USA); 20180521-20180525, May 18, 2018, XP051456979, Retrieved from the Internet: URL:http://www.3gpp.org/ftp/Meetings%5F3GPP%5FSYNC/SA3/Docs [retrieved on May 18, 2018], 3 pages.
International Search Report and Written Opinion—PCT/US2019/054821—ISA/EPO—Dec. 10, 2019.
Nokia et al., "23.502: Updating/Correcting Routing ID towards UE", 3GPP Draft; S2-188090—RoutingID, 3rd Generation Partnership Project (3GPP), Mobile Competence Centre, 650, Route Des Lucioles, F-06921 Sophia-Antipolis Cedex, France, vol. SA WG2. No. Sophia Anti Polis; 20180820-20180824 Aug. 14, 2018, XP051537029, Retrieved from the Internet: URL:http://www.3gpp.org/ftp/tsg%5Fsa/WG2%5FArch/TSGS2%5F128BIS%5FSophia%5FAntipolis/Docs/S2%2D188090%2Ezip [retrieved on Aug. 14, 2018], 10 pages.
Qualcomm Incorporated et al., "Update of Default Configured NSSAI and other UE Parameters via Control Plane Solution from UDM to AMF with Direct NAS Transport to UE", 3GPP Draft; S2-1813054-WAS-S2-1812099-WAS-1811541-WAS-1811405-WAS-1810061-23.502-UE Parameters Update UDM V2, 3rd Generation Partnership Project (3GPP), Mobile Competence Centre, 650, Route Des Lucioles, F-06921 Sophia-Antipolis Cedex, France, vol. SA WG2, No. Dongguan, P.R. China; 20181015-20181019 Nov. 29, 2018, XP051490581.
Qualcomm Incorporated: "Update of Routing ID in the UE", 3GPP Draft; S2-1810060_DP_RoutingID Update_V3, 3rd Generation Partnership Project (3GPP), Mobile Competence Centre, 650, Route Des Lucioles, F-06921 Sophia-Anti Polis Cedex, France, vol. SA WG2, No, Dongguan, P.R. China; 20181015-20181019 Oct. 9, 2018, XP051539057, Retrieved from the Internet: URL:https://www.3gpp.org/ftp/tsg_sa/WG2_Arch/TSGS2_129_Dongguan/Docs/S2-1810060.zip [retrieved on Oct. 9, 2018], 5 pages.
SA3: "Reply LS on Routing ID", 3GPP Draft; S3-183074 Reply LS on Routing ID, 3rd Generation Partnership Project (3GPP), Mobile Competence Centre, 650, Route Des Lucioles, F-06921 Sophia-Anti Polis Cedex, France, vol. CT WG4, No. Vilnius, Lithuania; 20181015-20181019 Oct. 3, 2018, XP051574336, Retrieved from the Internet: URL:http://www.3gpp.org/ftp/tsg%5Fct/WG4%5Fprotocollars%5Fex%2DCN4/TSGCT4%5F86bis%5FVilnus/Docs/C4%2D187311%2Ezip [retrieved on Oct. 3, 2018], 3 pages.
SA2: "LS on Routing ID", S2-188870, 3GPP TSG SA WG2 #128bis, Sophia Antipolis, Aug. 20-24, 2018, 1 page, https://www.3gpp.org/ftp/tsg_sa/WG2_Arch/TSGS2_128BIS_Sophia_Antipolis/Docs/S2-188870.zip [Date uploaded Aug. 26, 2018].
TSG CT: "Reply LS on Routing ID", CP-182238, 3GPP TSG CT Meeting #81, Gold Coast, Australia, Sep. 10-11, 2018, 1 page, URL: https://www.3gpp.org/ftp/tsg_ct/TSG_CT/TSGC_81_Gold_Coast/Docs/CP-182238.zip [Date uploaded Sep. 11, 2018].

* cited by examiner

TECHNIQUES FOR ROUTING ID UPDATE

CLAIM OF PRIORITY UNDER 35 U.S.C. § 119

This application claims benefit of U.S. Provisional Patent Application Ser. No. 62/742,151, filed Oct. 5, 2018, which is herein incorporated by reference in its entirety.

FIELD

The present disclosure relates generally to communication systems, and more particularly, to methods and apparatus for updating a routing ID associated with a user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for communication by a user equipment. The method generally includes determining whether a universal subscriber identification module (USIM) of the UE supports one or more parameters stored in the USIM to be updated, based on the determination, storing the received configuration information in at least one of: the USIM if the USIM supports the one or more parameters to be updated or memory of the UE if the USIM does not support the one or more parameters to be updated, generating an identifier for the UE based on the stored updated configuration information, and transmitting at least one message using the generated identifier.

Certain aspects provide an apparatus for communication by a user equipment. The apparatus generally includes means for determining whether a universal subscriber identification module (USIM) of the UE supports one or more parameters stored in the USIM to be updated, based on the determination, means for storing the received configuration information in at least one of: the USIM if the USIM supports the one or more parameters to be updated or memory of the UE if the USIM does not support the one or more parameters to be updated, means for generating an identifier for the UE based on the stored updated configuration information, and means for transmitting at least one message using the generated identifier.

Certain aspects provide a computer readable medium having instructions stored thereon for communication by a user equipment. The instructions generally include instructions for determining whether a universal subscriber identification module (USIM) of the UE supports one or more parameters stored in the USIM to be updated, based on the determination, storing the received configuration information in at least one of: the USIM if the USIM supports the one or more parameters to be updated or memory of the UE if the USIM does not support the one or more parameters to be updated, generating an identifier for the UE based on the stored updated configuration information, and transmitting at least one message using the generated identifier.

Certain aspects provide an apparatus for communication by a user equipment. The apparatus generally includes at least one processor configured to determine whether a universal subscriber identification module (USIM) of the UE supports one or more parameters stored in the USIM to be updated, based on the determination, store the received configuration information in at least one of: the USIM if the USIM supports the one or more parameters to be updated or memory of the UE if the USIM does not support the one or more parameters to be updated, generate an identifier for the UE based on the stored updated configuration information, and transmit at least one message using the generated identifier.

Certain aspects provide a method for communication by a unified data management (UDM) entity. The method generally includes generating updated configuration information corresponding to the UDM for use at a user equipment, transmitting a container intended for the UE, wherein the container includes the updated configuration information corresponding to the UDM, and receiving an acknowledgement message from the UE, acknowledging reception of the updated configuration information corresponding to the UDM.

Certain aspects provide an apparatus for communication by a unified data management (UDM) entity. The apparatus generally includes means for generating updated configuration information corresponding to the UDM for use at a user equipment, means for transmitting a container intended for the UE, wherein the container includes the updated configuration information corresponding to the UDM, and receiving an acknowledgement message from the UE, acknowledging reception of the updated configuration information corresponding to the UDM.

Certain aspects provide a computer readable medium having instructions stored thereon for communication by a unified data management (UDM) entity. The instructions generally include instructions for generating updated configuration information corresponding to the UDM for use at a user equipment, transmitting a container intended for the UE, wherein the container includes the updated configuration information corresponding to the UDM, and receiving an acknowledgement message from the UE, acknowledging reception of the updated configuration information corresponding to the UDM.

Certain aspects provide an apparatus for communication by a unified data management (UDM) entity. The apparatus generally includes at least one processor configured to generate updated configuration information corresponding to the UDM for use at a user equipment, transmit a container intended for the UE, wherein the container includes the updated configuration information corresponding to the UDM, and receiving an acknowledgement message from the UE, acknowledging reception of the updated configuration information corresponding to the UDM.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for updating a routing ID associated with a user equipment.

As noted, the following description provides examples of updating a routing ID associated with a user equipment in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
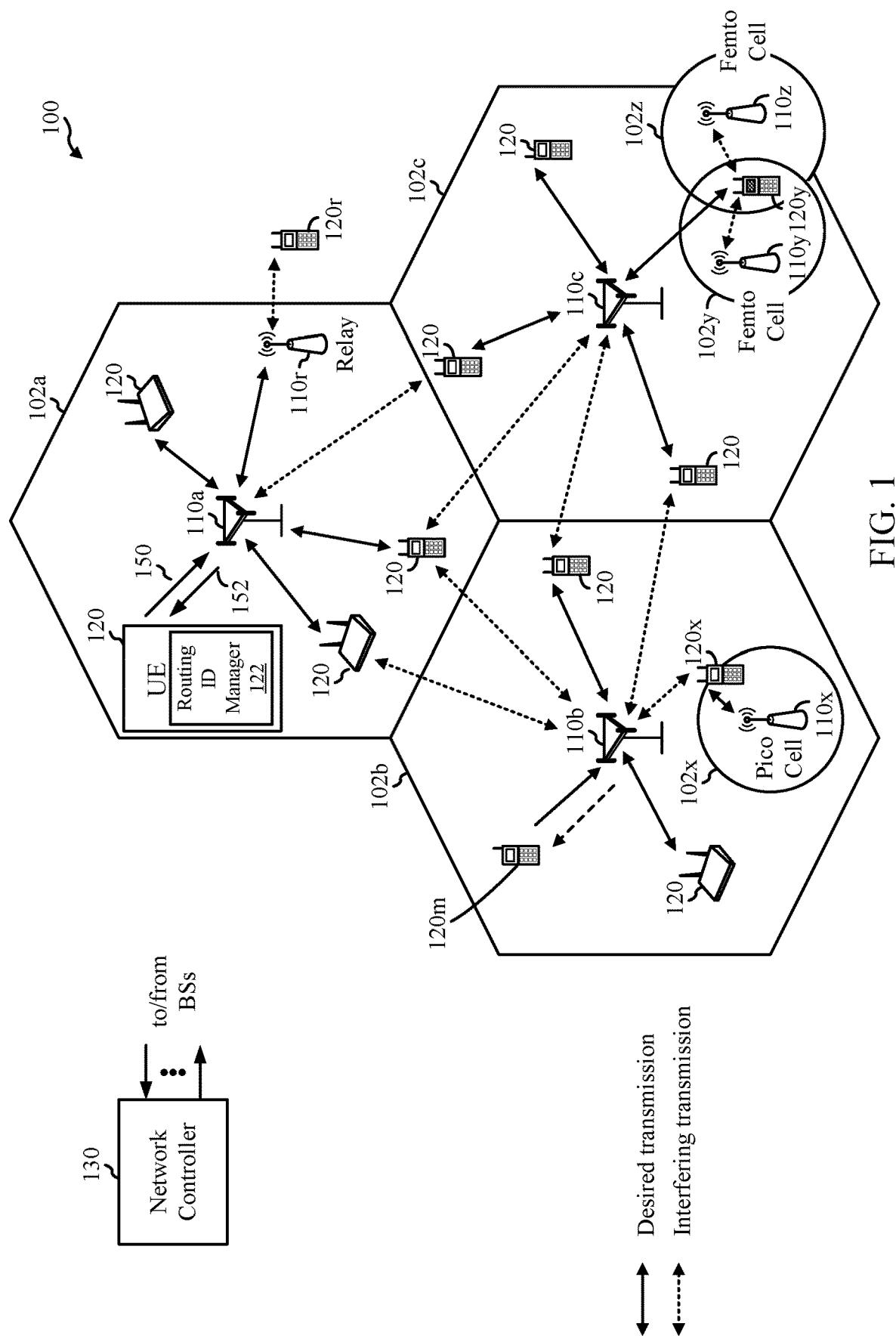
FIG. 1 is a block diagram conceptually illustrating an example telecommunications system, in accordance with certain aspects of the present disclosure.

FIG. 1 illustrates an example wireless communication network 100 in which aspects of the present disclosure may be performed for updating a routing ID associated with a user equipment. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110/UEs 120 may be configured for updating a routing ID associated with the UE 120 as explained below. For example, as shown in FIG. 1, the UE 120a includes a Routing ID manager 122. The Routing ID 122 may be configured, in some cases, to perform the operations illustrated in one or more of FIGS. 4-7 as well as other operations described herein for updating a routing ID associated with the UE 120, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2A:
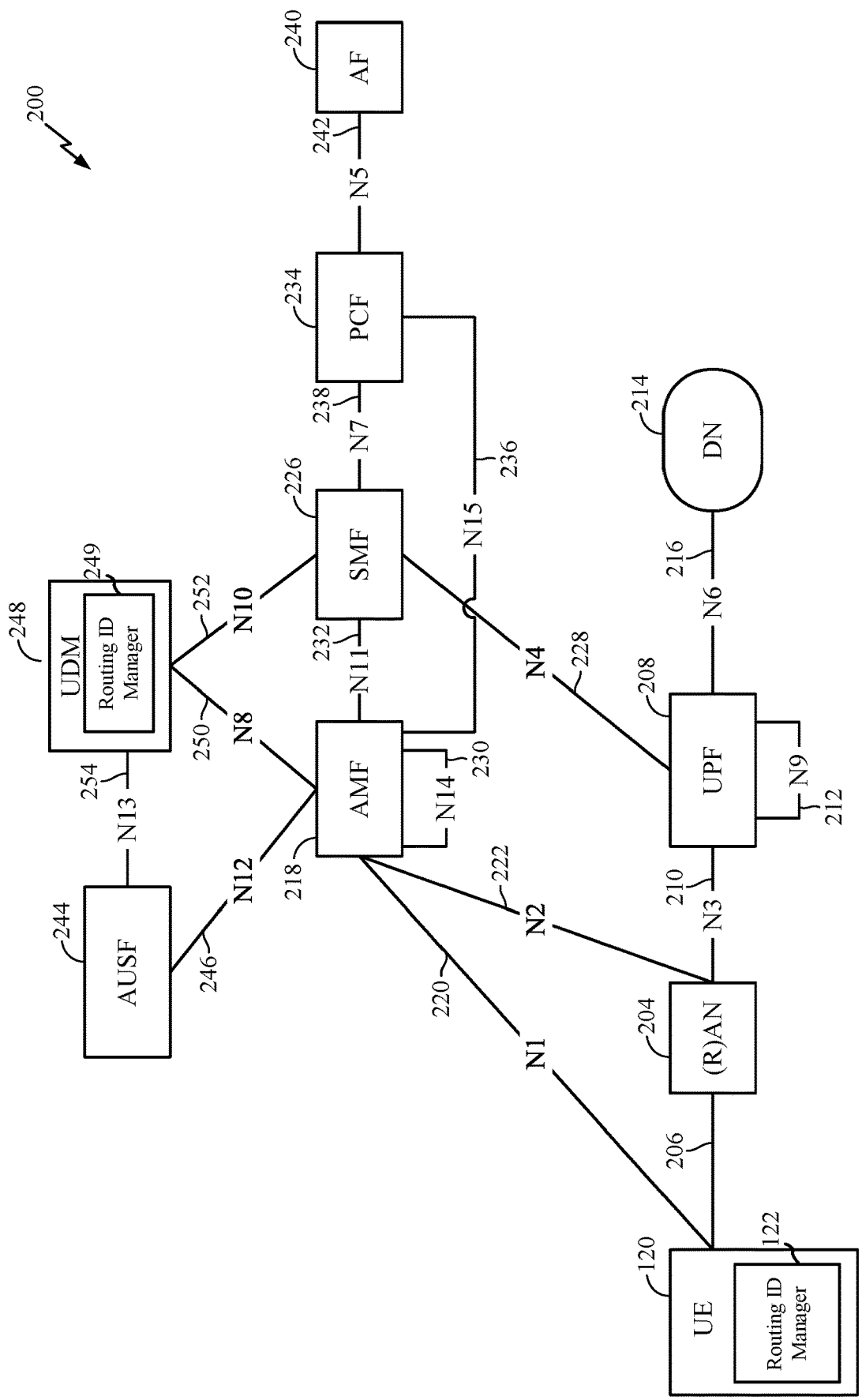
FIGS. 2A-2D are block diagrams illustrating example logical architectures of new radio (NR) access networks (RANs), in accordance with certain aspects of the present disclosure.

FIG. 2A illustrates an example logical architecture 200 of a New Radio (NR) access network, which may be implemented in the wireless communication system illustrated in FIG. 1. A UE 120 may access a radio access network (RAN) 204 via an NR air interface 206. According to certain aspects, UEs 120 may be configured for updating a routing ID associated with the UE 120, as explained below. For example, as shown in FIG. 2, the UE 120 includes a Routing ID manager 122. The Routing ID 122 may be configured, in some cases, to perform the operations illustrated in one or more of FIGS. 4-7 as well as other operations described herein for updating a routing ID associated with the UE 120, in accordance with aspects of the present disclosure.

The RAN may communicate with a user plane function (UPF) 208 via an N3 interface 210. Communications between different UPFs 208 may be conveyed via an N9 interface 212. The UPFs may communicate with a data network (DN) (e.g., the Internet, network-operator-provided services) 214 via one or more N6 interfaces 216. The UE may communicate with one or more core access and mobility management functions (AMFs) 218 via an N1 interface 220. The RAN may communicate with the one or more AMFs via an N2 interface 222. The UPFs may communicate with a session management function (SMF) 226 via an N4 interface 228.

Communications between different AMFs 218 may be conveyed via an N14 interface 230. The AMFs may communicate with the SMF 226 via an N11 interface 232. The AMFs may communicate with a policy control function (PCF) 234 via an N15 interface 236. The SMF may communicate with the PCF via an N7 interface 238. The PCF may communicate with an application function (AF) 240 via an N5 interface 242. The AMFs may communicate with an authentication server function (AUSF) 244 via an N12 interface 246. The AMFs may communicate with a unified data management (UDM) 248 via an N8 interface 250. The UDM 248 may uses the subscription data stored in a Unified Data Repository (UDR) and implements the application logic to perform various functionalities such as authentication credential generation, user identification, and service and session continuity. The SMF may communicate with the UDM via an N10 interface 252. The AUSF may communicate with the UDM via an N13 interface 254.

According to certain aspects, UDM 248 may be configured for updating a routing ID associated with the UE 120 as explained below. For example, as shown in FIG. 2, the UDM 248 includes a Routing ID manager 249. The Routing ID 249 may be configured, in some cases, to perform the operations illustrated in one or more of FIGS. 4-7 as well as other operations described herein for updating a routing ID associated with the UE 120, in accordance with aspects of the present disclosure.

While the example architecture 200 illustrates a single UE, the present disclosure is not so limited, and the architecture may accommodate any number of UEs. Similarly, the architecture shows the UE accessing a single DN, but the present disclosure is not so limited, and the architecture accommodates a UE communicating with a plurality of DNs, as described below with reference to FIG. 2B.

Figure 2B:
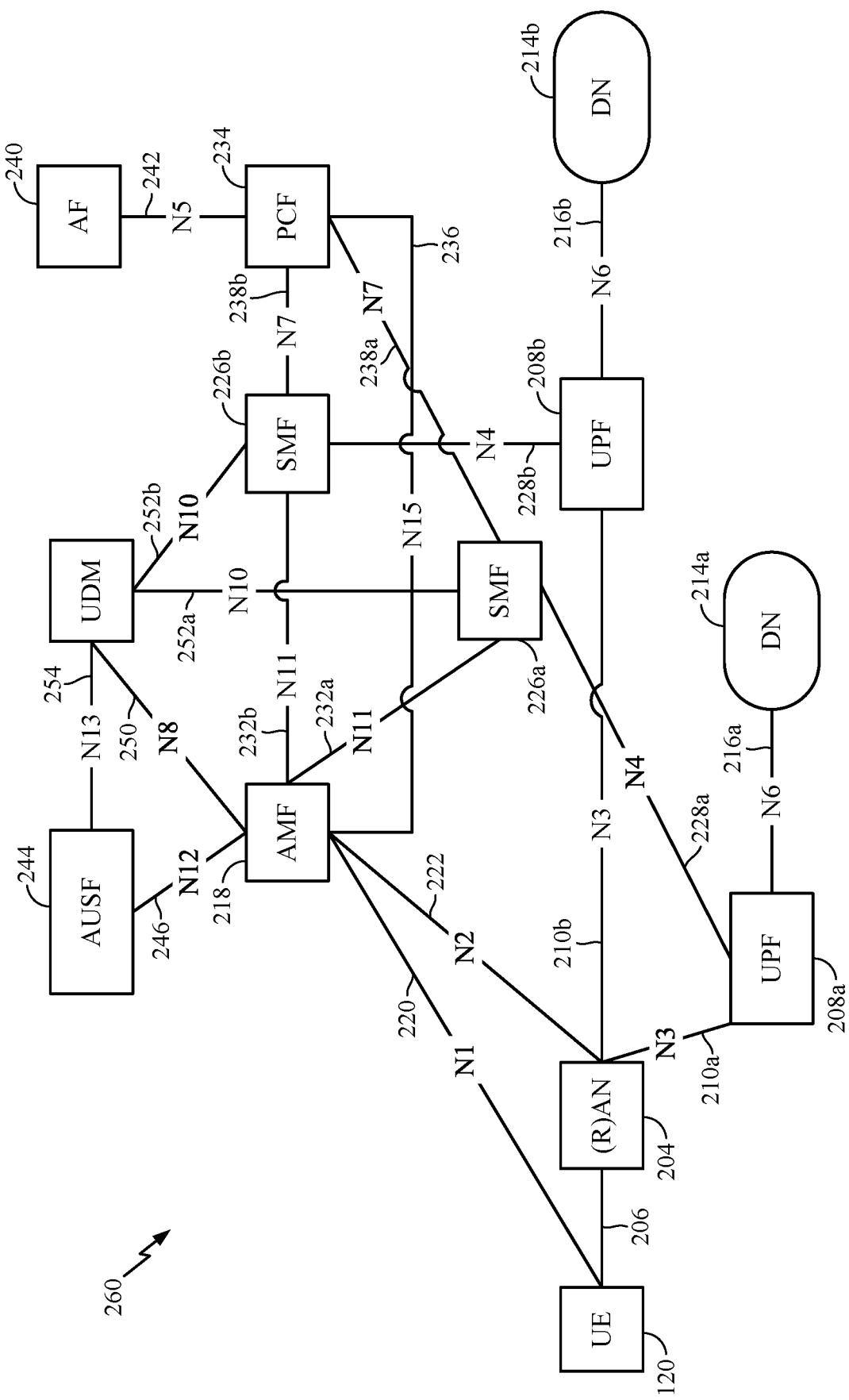

FIG. 2B illustrates an example logical architecture 260 of a New Radio (NR) access network (RAN), which may be implemented in the wireless communication system illustrated in FIG. 1. The logical architecture 250 is similar to the logical architecture 200 shown in FIG. 2A, with many of the same entities shown and labeled with the same labels. Thus, only differences from FIG. 2A will be described. The UE 120 in FIG. 2B is accessing two DNs, 214a and 214b, via the RAN 204. The RAN communicates with a first UPF 208a via a first N3 interface 210a. The RAN also communicates with a second UPF 208b via a second N3 interface 210b. Each UPF communicates with a corresponding DN 214a or 214b via a corresponding N6 interface 216a or 216b. Similarly, each UPF communicates with a corresponding SMF 226a or 226b via a corresponding N4 interface 228a or 228b. Each SMF communicates with the AMF 218 via a corresponding N11 interface 232a or 232b. Similarly, each SMF communicates with the PCF via a corresponding N7 interface 238a or 238b.

Figure 2C:
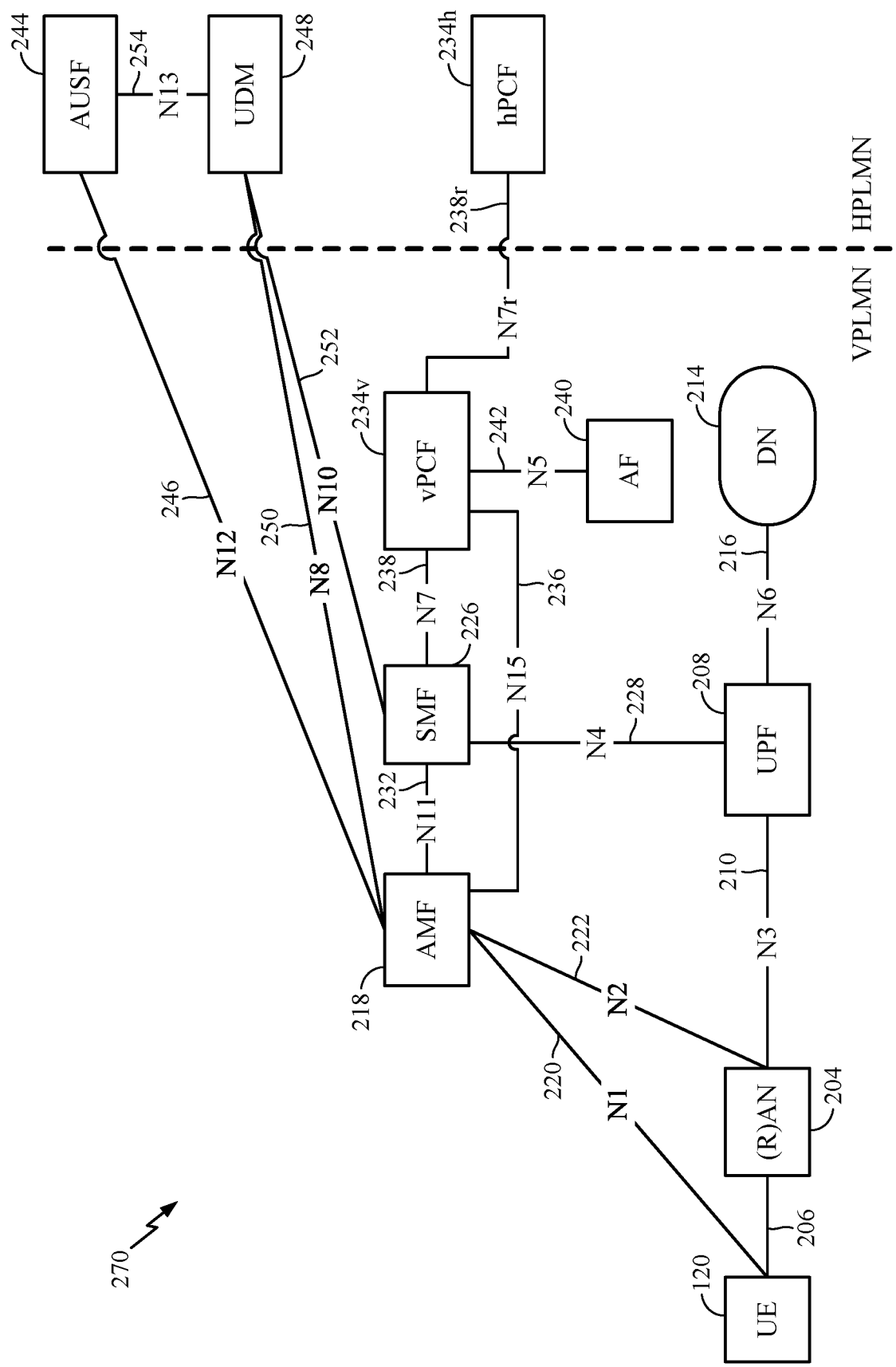

FIG. 2C illustrates an example logical architecture 270 of a New Radio (NR) access network (RAN), which may be implemented in the wireless communication system illustrated in FIG. 1. The logical architecture 270 is similar to the logical architecture 200 shown in FIG. 2A, with many of the same entities shown and labeled with the same labels. Thus, only differences from FIG. 2A will be described. In the logical architecture 270, the UE is roaming, and is therefore connected with the home physical land mobile network (HPLMN) of the UE via certain entities in the visited physical land mobile network (VPLMN). In particular, the SMF communicates with the VPLMN PCF (vPCF) 234v, but some policy information regarding the UE's access to the DN may be retrieved from the HPLMN PCF (hPCF) 234h via a roaming N7r interface 238r. In FIG. 2C, the UE is able to access the DN via the VPLMN.

Figure 2D:
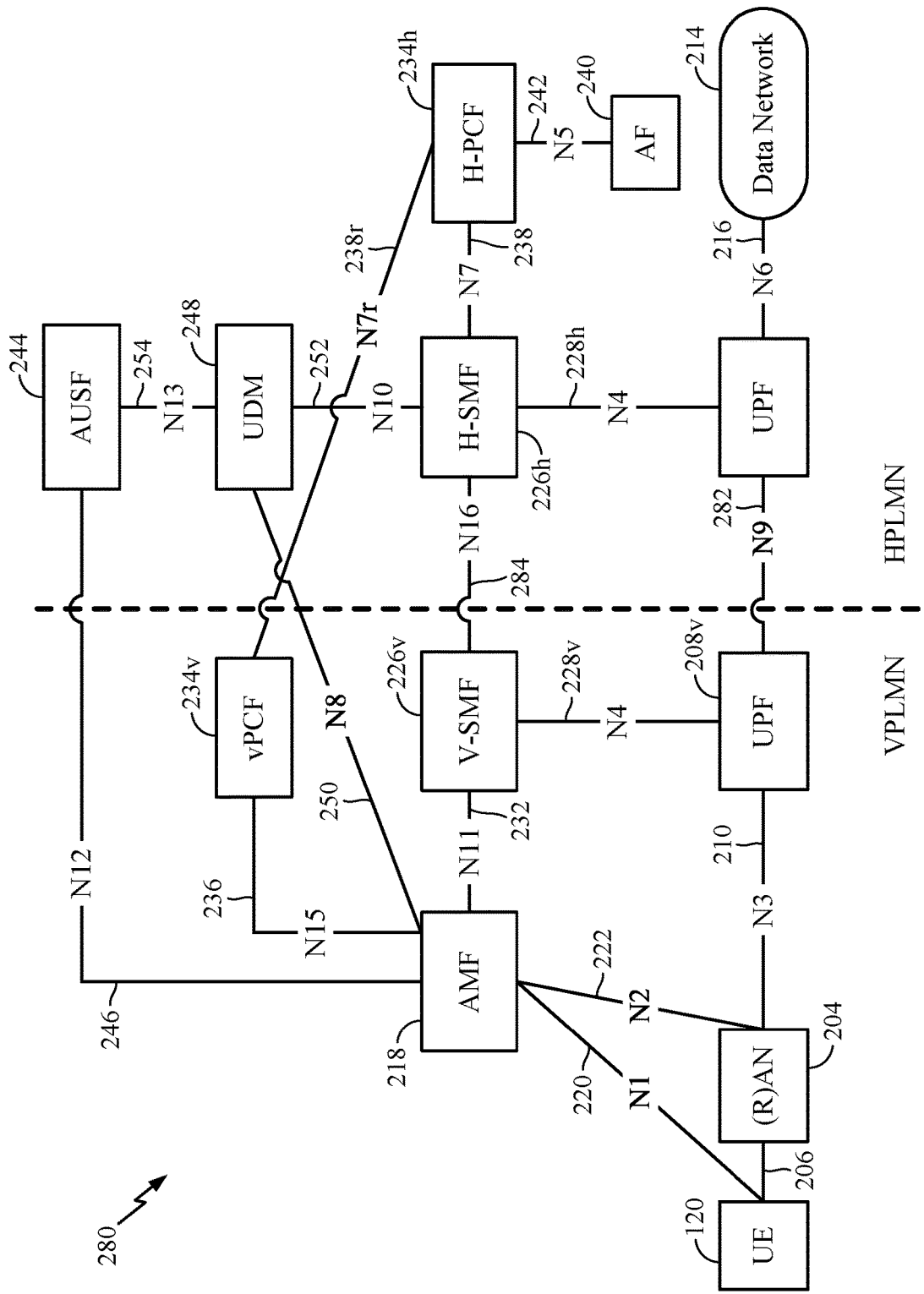

FIG. 2D illustrates an example logical architecture 280 of a New Radio (NR) access network (RAN), which may be implemented in the wireless communication system illustrated in FIG. 1. The logical architecture 280 is similar to the logical architecture 270 shown in FIG. 2C, with many of the same entities shown and labeled with the same labels. Thus, only differences from FIG. 2C will be described. In the logical architecture 280, the UE is roaming, and is therefore connected with the home physical land mobile network (HPLMN) of the UE via certain entities in the visited physical land mobile network (VPLMN). Unlike FIG. 2C, the UE in FIG. 2D is accessing a DN that the UE is not able to access via the VPLMN. Differences from FIG. 2C include that the UPF in the VPLMN communicates with the VPLMN SMF (V-SMF) 226v via an N4 interface 228v, while the UPF in the HPLMN communicates with the HPLMN SMF (H-SMF) 226h via an N4 interface 228h. The UPF of the VPLMN communicates with the UPF of the HPLMN via an N9 interface 282. Similarly, the V-SMF communicates with the H-SMF via an N16 interface 284.

Operations performed and protocols used by the various entities shown in the exemplary logical architectures 200, 250, 270, and 280 in FIGS. 2A-2D are described in more detail in documents "TS 23.501; System Architecture for the 5G System; Stage 2 (Release 15)" and "TS 23.502; Procedures for the 5G System; Stage 2 (Release 15)," both which are publicly available.

Figure 3:
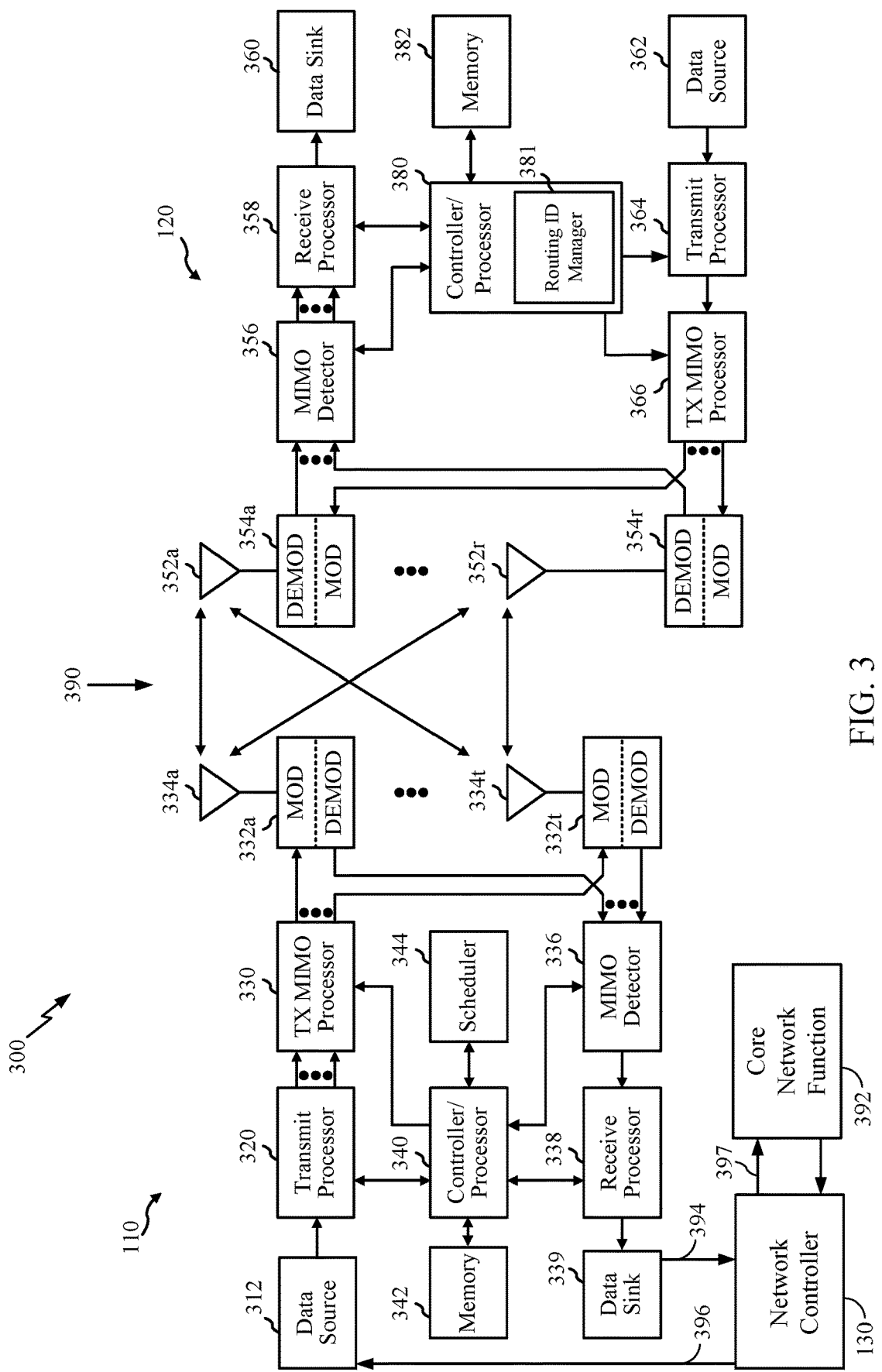
FIG. 3 is a block diagram conceptually illustrating a design of an example BS and user equipment (UE), in accordance with certain aspects of the present disclosure.

FIG. 3 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 352, Tx/Rx 222, processors 366, 358, 364, and/or controller/processor 380 of the UE 120 and/or antennas 334, processors 320, 330, 338, and/or controller/processor 340 of the BS 110 may be used to perform the operations described herein and illustrated with reference to FIGS. 9 and/or 10.

At the base station 110, a transmit processor 320 may receive data from a data source 312 and control information from a controller/processor 340. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. For example, the TX MIMO processor 330 may perform certain aspects described herein for RS multiplexing. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via antennas 334a through 334t, respectively.

At the UE 120, antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. For example, MIMO detector 356 may provide detected RS transmitted using techniques described herein. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the Physical Uplink Shared Channel (PUSCH)) from a data source 362 and control information (e.g., for the Physical Uplink Control Channel (PUCCH) from the controller/processor 380. The transmit processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct, e.g., the execution of the functional blocks illustrated in FIGS. 4-7, and/or other processes for the techniques described herein. The processor 380 and/or other processors and modules at the UE 120 may also perform or direct processes for the techniques described herein for updating a routing ID associated with the UE 120. For example, as shown in FIG. 3, the controller/processor 380 of the UE 120 includes a routing ID manager 381 that may be configured for performing the operations illustrated in one or more of FIGS. 4-7 as well as other operations described herein for updating a routing ID associated with the UE 120, according to aspects described herein. Although shown at the Controller/Processor, other components of the UE 120a and BS 110a may be used performing the operations described herein.

The memories 342 and 382 may store data and program codes for the BS 110 and the UE 120, respectively. A scheduler 344 may schedule UEs for data transmission on the downlink and/or uplink.

Example Routing ID Update

In 5G and new radio (NR) systems such as the wireless communication network 100, a Subscription Permanent Identifier (SUPI) may be used as a permanent identifier for a user equipment (UE). The SUPI may be equivalent to the international mobile subscriber identity (IMSI) used in 4G and LTE systems.

In some cases, SUPI privacy may be used. For example, in some cases, the SUPI may be sent in an over the air (OTA) transmission in a concealed/encrypted form, known as a Subscription Concealed Identifier (SUCI). Since SUCI is encrypted, the wireless communication network may not initially know where (e.g., to which unified data management (UDM)) to route messages containing the SUCI. Thus, a non-encrypted routing ID, provisioned in a user equipment's universal subscriber identification module (USIM), may be added to the SUCI to enable the network to select the correct unified data management (UDM) entity for a UE. As noted above with respect to FIGS. 2A-2D, the UDM may use subscription data stored in a Unified Data Repository (UDR) and implements the application logic to perform various functionalities such as authentication credential generation, user identification, and service and session continuity.

As the number of subscribers grows in 5G, operators of the wireless network may need to migrate a large number of UEs to a new UDM, in which case a routing ID for each of these UEs may need to be updated. However, existing mechanisms, such as OTA SIM, may not be suitable. For example, OTA SIM may comprise establishing an internet protocol (IP) connection to the UE and updating the USIM's content over the user plane. OTA SIM requires a specialized OTA platform and may have the following drawbacks: (1) OTA platforms are not standardized and are SIM-vendor specific, (22) establishing a user plane connection to a large number does not scale well, and (3) the user may get charge for the user connection depending on roaming agreements. Thus, aspects of the present disclosure provide techniques for handling scenarios where a routing ID of a UE needs to be updated.

Such techniques may take into account other considerations as well. For example, when a UDM is changed, other parameters may also change. For example, when the UDM is changed, parameters such as a home network public key, a home network public key ID associated with the home network public key, and protection scheme ID may change. Thus, techniques presented herein also take into account these additional parameter changes.

Additionally, there is a question of whether techniques should use a user plane or a control plane for updating the UDM. For example, the control plane may allow update procedures to be triggered directly from UDM to AMF, whereas the user plane may require the use of, for example, a server. Further, the size of the parameters to be sent/update (e.g., routing ID, home network public key, home network public key ID, and protection scheme ID) may not be large enough to exceed a maximum control plane message size. Additionally, if the control plane is used, sending the parameters during the registration procedures may cause some issues. For example, in some cases, overloading the registration procedure with routing ID update may delay the completion of the registration procedure. Moreover, in some cases, it may not be critical for the UE to receive an updated routing ID during registration since the wireless network may perform the update of routing ID at a different point in time ahead of actual UDM migration. Instead, the update procedure may be left up to the UDM when to trigger the UE to re-register with the updated routing ID. Using the registration procedure may force the network to wait until the UE initiates the registration procedure to be able to perform Routing ID update. Thus, using a network-initiated procedure instead, such as a network-initiated non-access stratum (NAS) transport procedure or a configuration update procedure, may allow the network to perform the routing ID update at anytime.

Further, techniques presented herein take into account whether the routing ID update procedure should terminate in the mobile entity (ME) (e.g., in non-volatile memory of the ME) or in the USIM. For example, an update procedure terminating in the USIM may allow updated parameters to be stored in the USIM. Thus, in this case there may not be a need to perform the routing ID update again if the USIM is put into another UE. However, a procedure terminating in the USIM may require the USIM to support secure packet encoding. It should be understood that, as used herein, a user equipment (UE) refers to a combination of a physical handset (e.g., the ME) and a USIM containing subscriber information. That is, it should be understood that when inserted into the ME, the USIM converts the ME from a physical handset into a user equipment.

Similarly, an update procedure terminating in the USIM may also require the network to support secure packet encoding. Thus, in order to accommodate operators that do not support secure packet encoding, the routing ID update procedure may, in some cases, terminate in the ME rather than in the USIM. Such a procedure may allow for the updated parameters to be stored, for example, in memory of the ME (e.g., non-volatile memory) instead of the USIM. Further, in some cases, it may be possible to use the update procedure terminating in the ME and still update the contents of the USIM. For example, in some cases, when the update procedure terminates in the ME, the ME may still be able to create/modify a new elementary file (EF) in the USIM with the updated parameters. For example, in the case of a routing ID update, the ME may store all of the received updated parameters in the new EF and may use them from that point onwards for SUCI calculation instead of the "old" parameters stored in existing EFs of the USIM.

Thus, in view of the above considerations, aspects of the present disclosure provide solutions for updating parameters (e.g., e.g., routing ID, home network public key, home network public key ID, and protection scheme ID) when a new UDM is selected or used. For example, a first solution may be to use an OTA SIM. However, when subscribers are migrated between UDMs in bulk (e.g., millions), involving OTA during such migration process may not be practical.

Another solution may involve defining new user-plane function to handle the updating. For example, in this case, a UE may be triggered to connect to, for example, a specific server via a control plane message such as a Registration Accept. However, there may still be the same concern regarding scalability as for OTA SIM. Additionally, some devices may not support user-plane functions (e.g., consumer internet of things (CIoT) devices).

Another solution may involve using a steering of roaming (SoR) control plane solution during registration with termination in the ME. Such a solution may involve using a new container included in a Registration Accept message that includes all parameters needed to be updated, plus an indication of whether the UE needs to re-register. According to aspects, this solution may be used both in the UEs home public land mobile network (HPLMN) and in a visited public land mobile network (VPLMN). Further, according to aspects, there may be two variants of this solution. For example, a first variant may involve storing an updated routing ID and other associated parameters (e.g., received in the registration accept message) in the ME (e.g., non-volatile memory of the ME), which may then be used to compute SUCI from that point onward. A second variant may be involve writing the updated routing ID and other associated parameters (e.g., received in the registration accept message) to a new EF that is stored in the USIM. The new EF (and corresponding parameters, such as the updated routing ID) may then be used to compute SUCI from that point onward.

Another solution may involve using a SoR control plane solution during registration with termination in the USIM. For example, in this solution, a new container, included in Registration Accept message, may be used to indicate all parameters that need to be updated, as well as an indication of whether UE needs to re-register. According to aspects, this procedure may apply both in the UE's HPLMN and in a VPLMN.

Another solution may involve using a configuration update procedure with termination in the ME. For example, this solution may include adding a new IE to a Configuration Update Command that includes the updated routing ID and all other associated parameters (e.g., home network public key, a home network public key ID associated with the home network public key, and protection scheme ID). In some cases, this solution may involve two variants. For example, a first variant may involve storing an updated routing ID and all other associated parameters (e.g., received in the Configuration Update Command) in the ME (e.g., in the ME's non-volatile memory), which may then be used to compute SUCI from that point onwards. A second variant of this solution may involve writing the updated routing ID and all other associated parameters to a new EF stored in the USIM, which may then be used to calculate the SUCI from that point onwards. However, in this solution, there may be no end-to-end security that is ensured in the case of roaming unless SOR-like security protection is added to the new IE in the Configuration Update Command. This issue, however, may be resolved by limiting this solution/procedure to the case where the UE is not roaming, which, in some cases, may not be acceptable to operators (e.g., some devices such as CIoT devices may be roaming continuously). Further, it should be noted that the routing ID and associated parameters (e.g., home network public key, a home network public key ID associated with the home network public key, and protection scheme ID) may not be access and mobility management-related parameters decided and provided by the AMF, so strictly speaking these parameters may, in some cases, not be within the scope of the configuration update procedure.

Another solution may involve using a configuration update procedure with termination in the USIM. For example, this solution may require a new IE to be added to a Configuration Update Command that includes the update routing ID and all other associated parameters (e.g., home network public key, a home network public key ID associated with the home network public key, and protection scheme ID). According to aspects, the information included in the new IE may be encoded using secure packet encoding, which may then be written to the USIM.

Another solution may involve using a SoR control plane solution after registration with termination in the ME. For example, after registration, a downlink non-access stratum (NAS) transport message may include a new container that includes all of the parameters that need to be updated (e.g., updated routing ID, home network public key, a home network public key ID associated with the home network public key, and protection scheme ID) as well as an indication of whether the UE needs to re-register. In some cases, this solution may include two variants. For example, a first variant may involve storing the updated parameters in non-volatile memory of the ME, which my then be used to compute SUCI from that point onwards. In a second variant, the updated parameters may be written by the ME to a new EF stored in the USIM, which may then be used to compute SUCI from that point onward.

Figure 4:
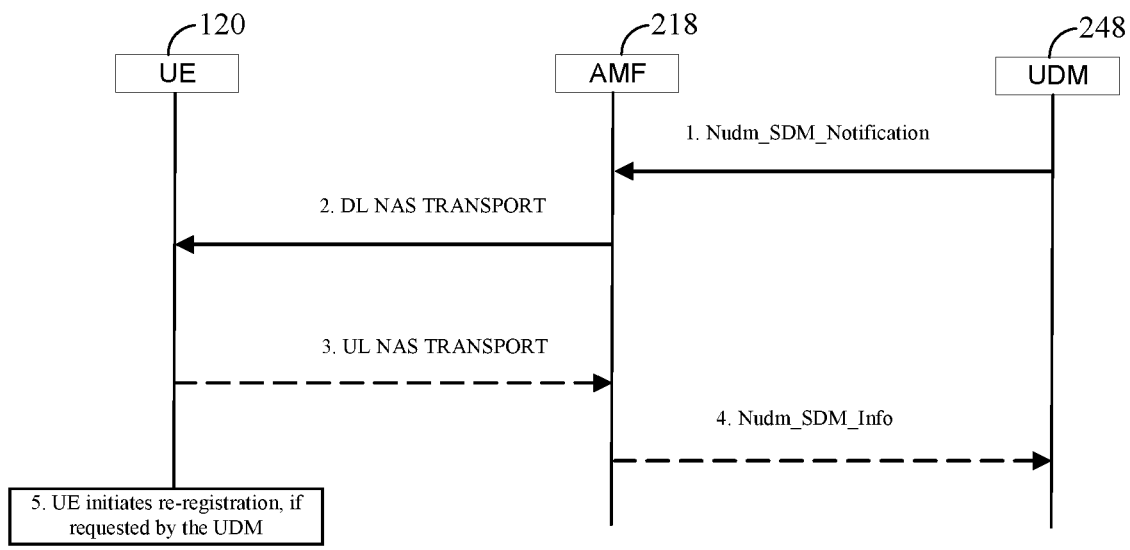
FIG. 4 illustrates an example call flow diagram for updating a routing ID associated with a user equipment, in accordance with certain aspects of the present disclosure.

FIG. 4 is an example call-flow diagram illustrating the procedure of updating a routing ID using a SoR control plane solution after registration with termination in the ME. As illustrated, the UE 120 may be served by AMF 218 and UDM 248.

As illustrated, at step 1, the UDM 248 notifies the changes of the user profile to the affected AMF 218 by the means of invoking Nudm_SDM_Notification service operation. The Nudm_SDM_Notification service operation may contain "UDM update data" that may be delivered in a transparent container to the UE over NAS within Access and Mobility Subscription data. The "UDM update data" may include, for example, (1) the updated Routing ID and optionally the associated updated Home Network Public Key, Home Network Public Key ID, and Protection Scheme ID, (2) whether the UE needs to send an acknowledgement (ACK) to the UDM, and/or (3) whether the UE needs to re-register after updating the data.

At step 2 in FIG. 4, the AMF 218 sends a DL NAS TRANSPORT message (e.g., a control plane message) to the served UE 120. The AMF 218 may include the transparent container received from the UDM 248 in the DL NAS TRANSPORT message.

According to aspects, after receiving the DL NAS TRANSPORT message at step 2, the UE 120 may perform a security check to verify whether the "UDM update data" is provided by the UE's HPLMN. According to aspects, if the security check on the "UDM update data" is successful (e.g., the "UDM update data" is provided by the HPLMN), the UE 120 may then determine whether a USIM of the UE 120 supports one or more parameters stored in the USIM to be updated based on the "UDM update data". For example, in some cases, the determination of whether the USIM supports one or more parameters to be updated may depend whether an EF_Routing_ID_update file is present on the USIM, which would allow for the parameters corresponding to the "UDM update data" to be updated. For example, in some cases, the UE 120 may read data stored on the USIM and determine if the data stored on the USIM includes the EF_Routing_ID_update file.

According to aspects, based on the determination of whether the USIM of the UE 120 supports one or more parameters stored in the USIM to be updated, the UE 120 may store the "UDM update data" in at least one of: (1) the USIM if the USIM supports the one or more parameters to be updated, or (2) memory of the UE 120 (e.g., memory of the ME of the UE 120) if the USIM does not support the one or more parameters to be updated. For example, when the EF_Routing_ID_update file is present on the USIM, the UE 120 may write the updated Routing ID and optionally the associated updated Home Network Public Key, Home Network Public Key ID, and Protection Scheme ID to the EF_Routing_ID_update file in the USIM and use those parameters from that point onwards for SUCI calculation. That is, for example, the UE 120 may generate an identifier for the UE 120 (e.g., SUCI) based on the updated parameters stored in the USIM and use the generated identifier when transmitting one or more messages.

When, however, the EF_Routing_ID_update file is not present on the USIM, the UE 120 may store the updated Routing ID (and optionally the associated updated Home Network Public Key, Home Network Public Key ID, and Protection Scheme ID) in a non-volatile memory in the ME of the UE 120 and uses those parameters from that point onwards for SUCI calculation. That is, for example, the UE 120 may generate an identifier for the UE 120 (e.g., SUCI) based on the updated parameters stored in the ME's non-volatile memory and use the generated identifier when transmitting one or more messages.

According to aspects, if the security check on the "UDM update data" fails (e.g., the "UDM update data" is not from an HPLMN), the UE 120 may discard the contents of the "UDM update data" received in the DL NAS TRANSPORT message at step 2.

At step 3 in FIG. 4, if the UE 120 has verified that the "UDM update data" is provided by HPLMN and the UDM 248 has requested the UE 120 to send an ACK to the UDM 248 (e.g., in the transparent container), the UE may transmit an UL NAS TRANSPORT message to the serving AMF 218 with a transparent container including the UE acknowledgement.

At step 4 in FIG. 4, if the AMF 218 receives an UL NAS TRANSPORT message with a transparent container carrying a UE acknowledgement from the UE 120, the AMF 218 transmits a Nudm_SDM_Info request message including the transparent container to the UDM 248.

At step 5 in FIG. 4, if the UDM 248 has requested the UE 120 to re-register by providing an indication in the "UDM Update Data," the UE 120 may wait until the UE 120 goes back to idle and initiates a mobility registration update to re-register with the UDM 248.

Figure 5:
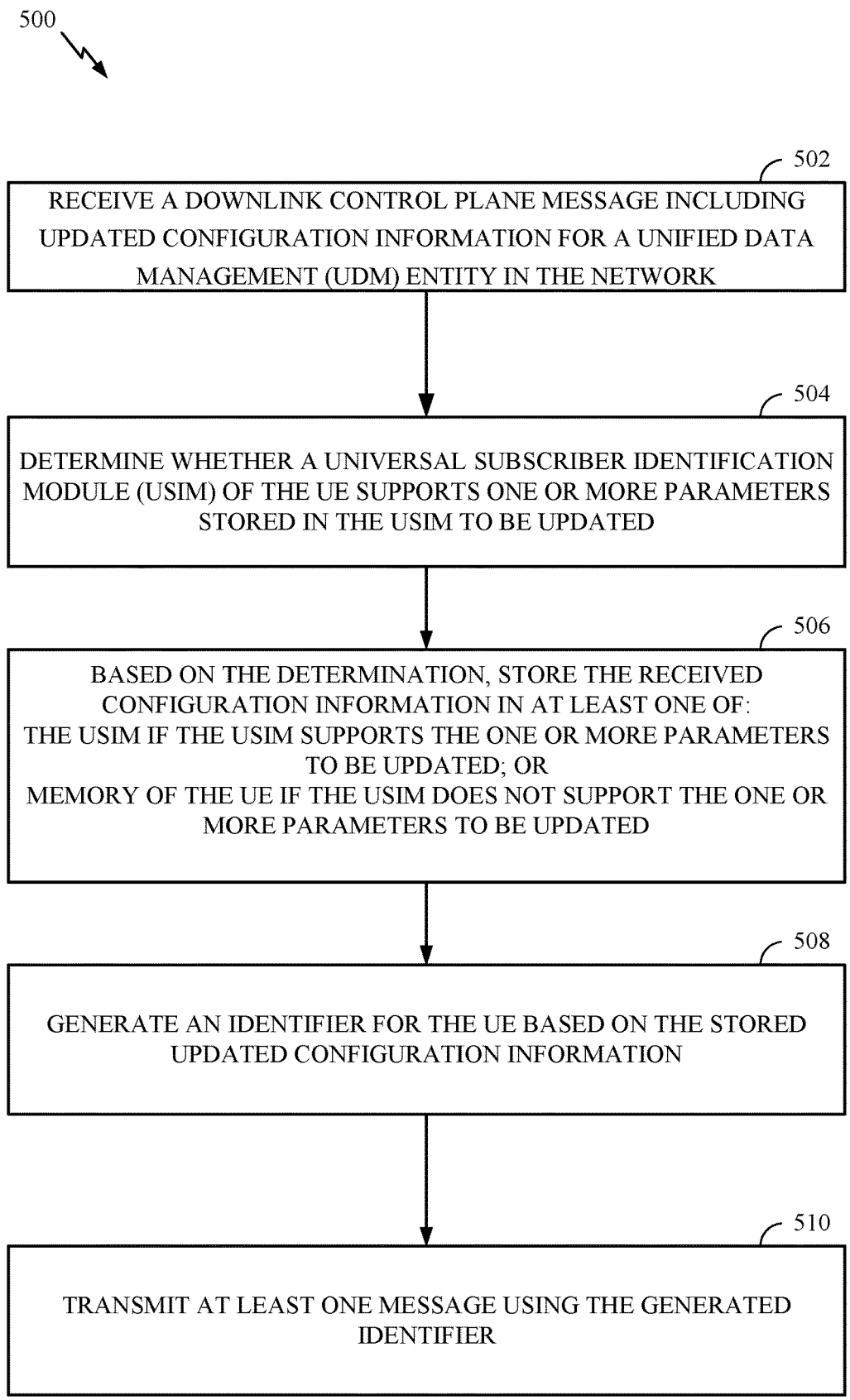
FIG. 5 illustrates example operations for wireless communication by a user equipment (UE), in accordance with aspects of the present disclosure.

FIG. 5 illustrates example operations 500 for wireless communication in a network. Operations 500 may be performed, for example, by a wireless communications device, such as a UE 120.

The wireless communications device may include one or more components as illustrated in FIG. 3, which may be configured to perform operations 500 described herein. For example, in some cases, the antenna 452, demodulator/modulator 454, transmit processor 464, controller/processor 480, and/or memory 482 of the user equipment 120, as illustrated in FIG. 3, may perform operations 500 described herein.

Operations 500 begin at 502 by receiving a downlink control plane message including updated configuration information for a Unified Data Management (UDM) entity in the network. According to aspects, the updated configuration information includes at least one of: a routing ID for the UDM entity, a home network public key, a home network public key identifier (ID), or a protection scheme ID. According to aspects, the downlink control plane message may comprise a downlink non-access stratum transport message. Additionally, in some cases, the downlink control plane message may further include information requesting the UE to transmit an acknowledgement message At 504, the UE determines whether a universal subscriber identification module (USIM) of the UE supports one or more parameters stored in the USIM to be updated.

At 506 the UE, based on the determination, stores the received configuration information in at least one of: the USIM if the USIM supports the one or more parameters to be updated or memory of the UE if the USIM does not support the one or more parameters to be updated. For example, in certain cases, memory of the UE may comprise non-volatile memory of the ME of the UE.

At 508, the UE generates an identifier for the UE based on the stored updated configuration information. In some cases, the identifier may include a subscription concealed identifier (SUCI). Additionally, the identifier may also include the routing ID for the UDM entity received in the updated configuration information.

At 510, the UE transmits at least one message using the generated identifier.

According to aspects, the UE may additionally determine whether the downlink control plane message was provided by a Home Public Land Mobile Network (HPLMN) corresponding to the UE, for example, based on whether a security check associated with the downlink control plane message passes, as described above. In some cases, the storing operation performed by the UE may be further based on the determination of whether the downlink control plane message was provided by the HPLMN. For example, in some cases, when the downlink control plane message is not provided by the HPLMN, the UE may discard the updated configuration information.

Additionally, in some cases, if the downlink control plane message includes information requesting the UE to transmit an acknowledgement message, operations 500 may include further include transmitting an acknowledgement message acknowledging reception of the downlink control plane message. In some cases, the acknowledgement message may be transmitted by the UE in an uplink non-access stratum transport message.

Additionally, in some cases, the downlink control plane message may include a request for the UE to re-register with the UDM entity corresponding to the updated configuration information received in the downlink control plane message. Thus, in response to the re-register request, the UE may re-register with the UDM entity. According to aspects, the UE may perform the re-registering in an idle state of the UE by triggering a mobility registration update.

Figure 6:
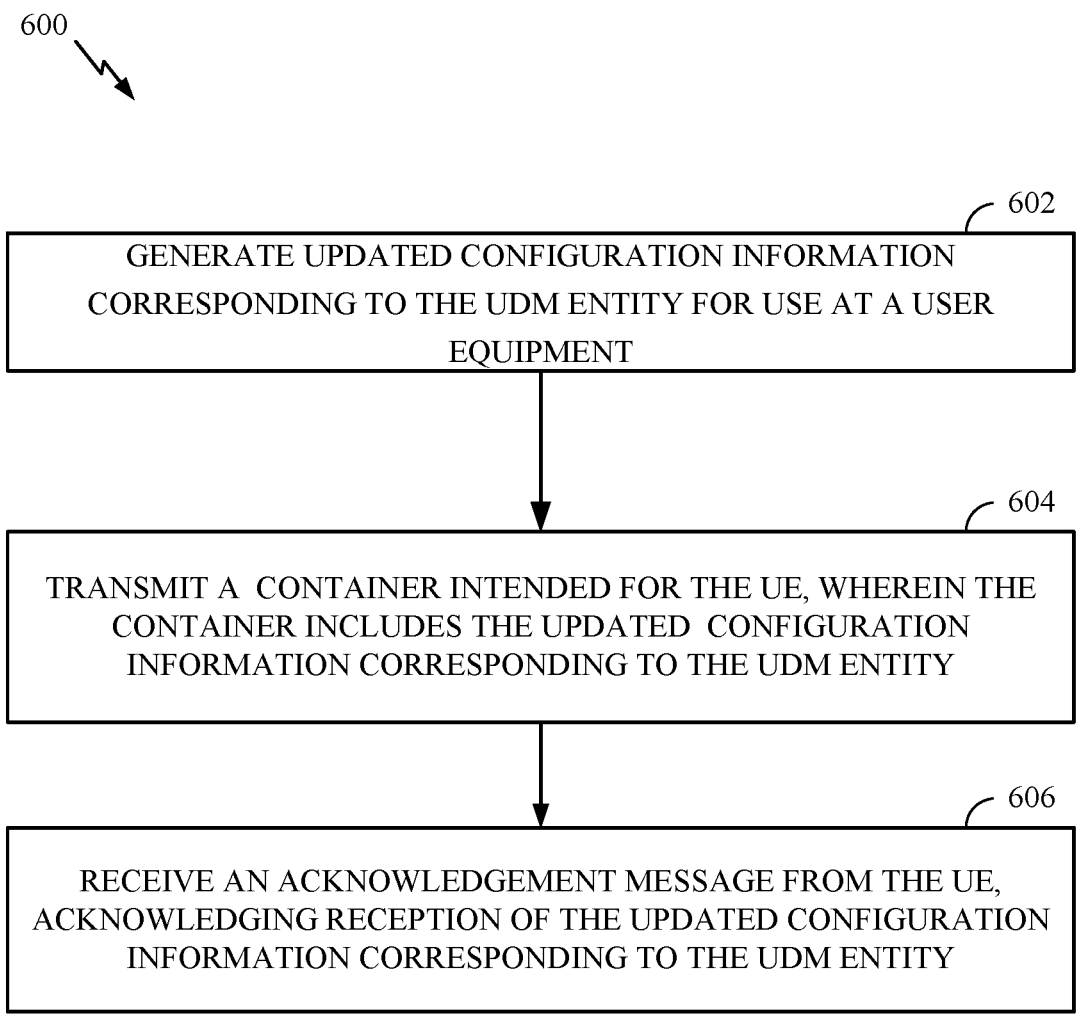
FIG. 6 illustrates example operations for wireless communication by a network entity, in accordance with aspects of the present disclosure.

FIG. 6 illustrates example operations 600 for wireless communication in a network. Operations 600 may be performed, for example, one or more network entities, such as a UDM 248 entity referenced above. Operations 600 may be considered complimentary to operations 50 performed by the UE 120.

Operations 600 begin at 602 by generating updated configuration information corresponding to the UDM for use at a user equipment.

At 604, the UDM entity transmits a container intended for the UE, wherein the container includes the updated configuration information corresponding to the UDM entity. In some cases, the UDM entity transmits the container to an AMF entity. Thereafter, in some cases, the container may be encapsulated in a downlink non-access stratum transport message, for example, by an AMF entity. Additionally, in some cases, container includes information requesting the UE to transmit the acknowledgement message.

At 606, the UDM entity receives an acknowledgement message from the UE, acknowledging reception of the updated configuration information corresponding to the UDM entity. In some cases, acknowledgement message may be received in container encapsulated in an uplink non-access stratum transport message.

In some cases, operations 600 may further include receiving a message including an identifier generated based, at least in part, on the updated configuration information. According to aspects, the identifier includes a subscription concealed identifier (SUCI) which includes the routing ID for the UDM entity transmitted in the updated configuration information.

Additionally, in some cases, the container includes a request for the UE to re-register with the UDM entity corresponding to the updated configuration information transmitted in the container. In such a case, operations 600 may further include further performing a re-registration procedure with the UE based on the request for the UE to re-register.

Figure 7:
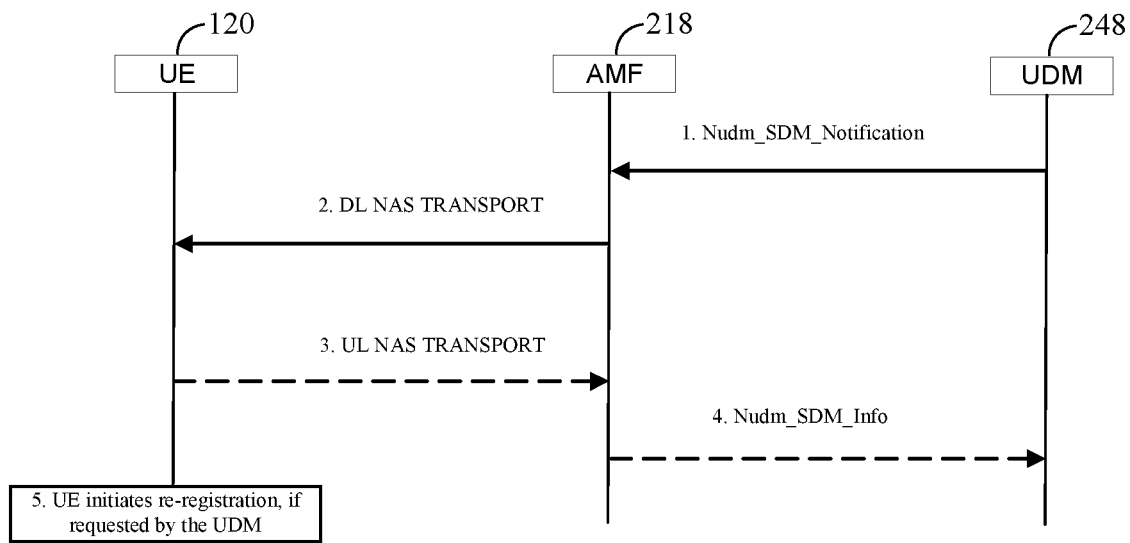
FIG. 7 illustrates an example call flow diagram for updating a routing ID associated with a user equipment, in accordance with certain aspects of the present disclosure.

According to aspects, yet another solution for updating the routing ID, as described above, may involve using a SoR control plane solution after registration with termination in the USIM. FIG. 7 is an example call-flow diagram illustrating the procedure of using a SoR control plane solution after registration with termination in the USIM.

For example, as illustrated in FIG. 7, at step 1, the UDM 248 notifies the changes of the user profile to the affected AMF 218 by the means of invoking Nudm_SDM_Notification service operation. The Nudm_SDM_Notification service operation may contain the "UDM update data" that may be delivered transparently to the UE over NAS within the Access and Mobility Subscription data. In some cases, the "UDM update data" may include: (1) a secure packet encoded as specified in 3GPP TS 31.115, containing: the updated Routing ID and optionally the associated updated Home Network Public Key, Home Network Public Key ID, and Protection Scheme ID, (2), whether the UE needs to send an acknowledgement (ACK) to the UDM, and/or (3) whether the UE needs to re-register after updating the data.

At step 2 in FIG. 7, the AMF 218 sends a DL NAS TRANSPORT message to the served UE. The AMF 218 may include the transparent container received from the UDM 248 in the DL NAS TRANSPORT message.

According to aspects, after receiving the DL NAS TRANSPORT message at step 2, the UE 120 may perform a security check to verify whether the "UDM update data" is provided by the UE's HPLMN. According to aspects, if the security check on the "UDM update data" is successful (e.g., the "UDM update data" is provided by the HPLMN), the UE 120 may upload the secured packet included in the transparent container to the USIM using procedures described, for example, in 3GPP TS 31.111. If, however, the security check on the "UDM update data" fails (e.g., the "UDM update data" is not provided by the HPLMN), the UE 120 may discard the contents of the "UDM update data".

At step 3 in FIG. 7, if the UE 120 has verified that the "UDM update data" is provided by HPLMN and the UDM 248 has requested the UE 120 to send an ACK to the UDM 248, the UE 120 sends an UL NAS TRANSPORT message to the serving AMF 218 with a transparent container including the UE acknowledgement.

At step 4 in FIG. 7, if the AMF 218 receives the UL NAS TRANSPORT message with a transparent container carrying a UE acknowledgement from the UE 120, the AMF 218 sends a Nudm_SDM_Info request message including the transparent container to the UDM 248.

At step 5 in FIG. 7, if the UDM 248 has requested the UE 120 to re-register by providing an indication in the "UDM Update Data", the UE 120 may wait until the UE 120 goes back into idle and initiates a mobility registration update to re-register with the UDM 248.

Figure 8:
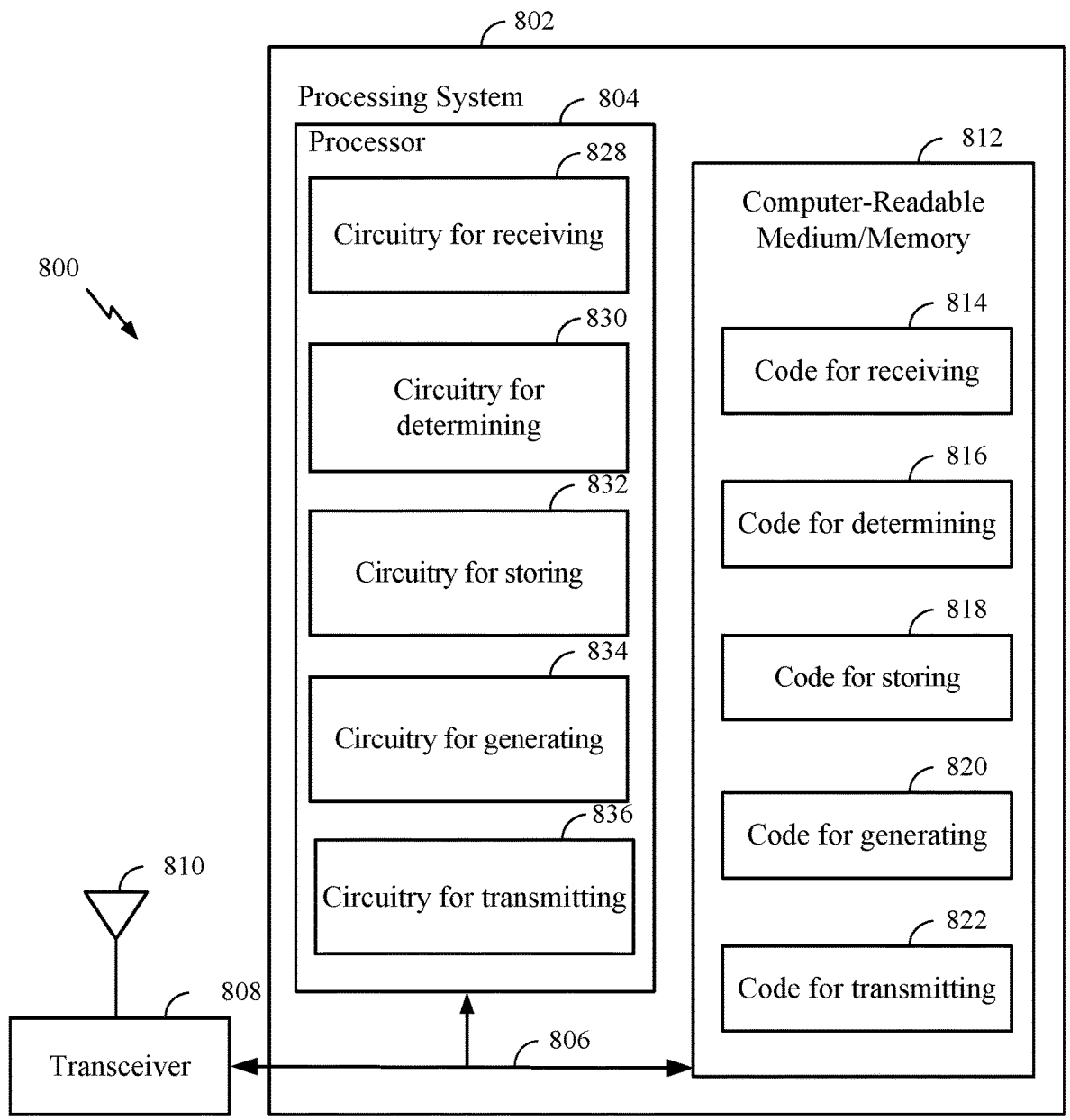
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIGS. 4-7. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 4-7, or other operations for performing the various techniques discussed herein for updating a routing ID associated with a user equipment (e.g., UE 120). In certain aspects, computer-readable medium/memory 812 stores code for performing the operations illustrated in one or more of FIGS. 4-7. For example, computer-readable medium/memory 812 stores code 814 for receiving; code 816 for determining; code 818 for storing; code 820 for generating; and code 822 for transmitting. Additionally, while not illustrated, computer-readable medium/memory 812 may also store code for performing a registration procedure.

In certain aspects, the processor 804 may include circuitry configured to implement the code stored in the computer-readable medium/memory 812, such as for performing the operations illustrated in FIGS. 4-7. For example, the processor 804 includes circuitry 828 for receiving; circuitry 830 for determining; circuitry 832 for storing; circuitry 834 for generating; and circuitry 836 for transmitting. Additionally, while not illustrated, processor 804 may also include circuitry for performing a registration procedure.

Figure 9:
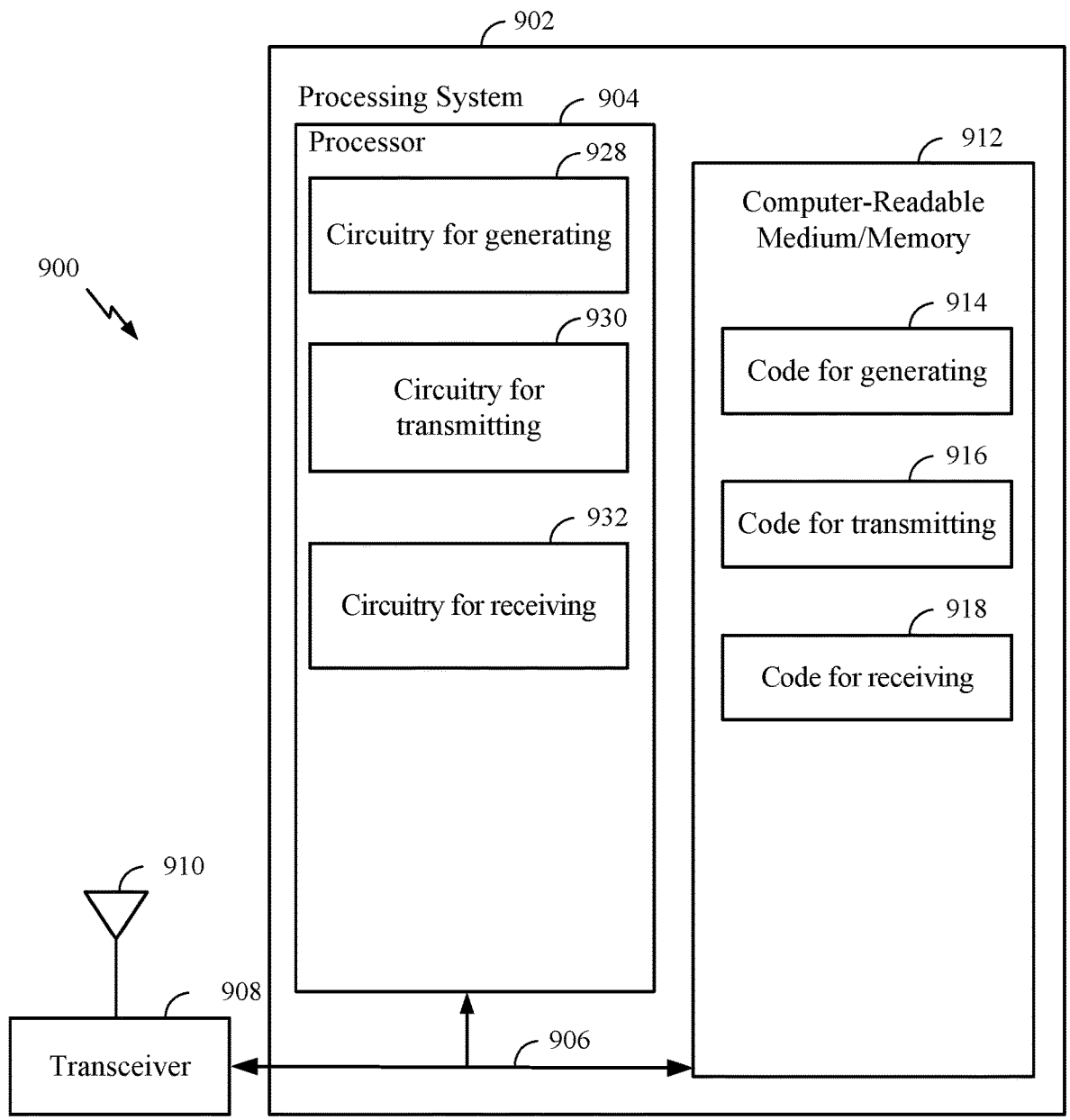
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIGS. 4-7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 4-7, or other operations for performing the various techniques discussed herein for updating a routing ID associated with a user equipment (e.g., UE 120). In certain aspects, computer-readable medium/memory 912 stores code for performing the operations illustrated in one or more of FIGS. 4-7. For example, computer-readable medium/memory 912 stores code 914 for generating; code 916 for transmitting; and code 918 for receiving. Additionally, while not illustrated, computer-readable medium/memory 912 may also store code for performing a registration procedure.

In certain aspects, the processor 904 may include circuitry configured to implement the code stored in the computer-readable medium/memory 912, such as for performing the operations illustrated in FIGS. 4-7. For example, the processor 904 includes circuitry 928 for generating; circuitry 930 for transmitting; and circuitry 932 for receiving. Additionally, while not illustrated, processor 904 may also include circuitry for performing a registration procedure.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication in a network by a user equipment (UE), comprising:
receiving, via a network entity, a downlink control plane message including updated configuration information for a Unified Data Management (UDM) entity in the network, wherein the updated configuration information includes a routing ID for the UDM entity;
based at least in part on whether a universal subscriber identification module (USIM) of the UE supports one or more parameters stored in the USIM to be updated, storing the received configuration information in at least one of:
  the USIM when the USIM supports the one or more parameters to be updated; or
  memory of the UE when the USIM does not support the one or more parameters to be updated;
generating an identifier for the UE based on the stored updated configuration information, wherein the identifier includes a subscription concealed identifier (SUCI), wherein the SUCI includes the routing ID for the UDM entity received in the updated configuration information; and
transmitting, to the network entity, at least one message using the generated identifier.

2. The method of claim 1, further comprising determining whether the downlink control plane message was provided by a Home Public Land Mobile Network (HPLMN) corresponding to the UE, wherein the storing is based at least in part on the determination of whether the downlink control plane message was provided by the HPLMN.

3. A method for wireless communication in a network by a user equipment (UE), the method comprising:
  receiving, from a network entity, a downlink control plane message including updated configuration information for a Unified Data Management (UDM) entity in the network, wherein the updated configuration information includes a routing ID for the UDM entity;
  determining whether the downlink control plane message, which included the updated configuration information for the UDM entity in the network that included the routing ID for the UDM entity, was provided by a Home Public Land Mobile Network (HPLMN) corresponding to the UE; and
  discarding the updated configuration information based at least in part on a determination that the downlink control plane message, which included the updated configuration information for the UDM entity in the network that included the routing ID for the UDM entity, was not provided by the HPLMN corresponding to the UE.

4. The method of claim 1, wherein:
  the updated configuration information further includes at least one of a home network public key, a home network public key identifier (ID), or a protection scheme ID.

5. The method of claim 1, wherein the downlink control plane message comprises a downlink non-access stratum transport message.

6. The method of claim 1, wherein the downlink control plane message includes information requesting the UE to transmit an acknowledgement message; and
  further comprising transmitting an acknowledgement message acknowledging reception of the downlink control plane message based at least in part on the information requesting the UE to transmit an acknowledgement message, wherein the acknowledgement message is transmitted in an uplink non-access stratum transport message.

7. The method of claim 1, wherein the downlink control plane message includes a request for the UE to re-register with the UDM entity corresponding to the updated configuration information received in the downlink control plane message; and
  further comprising re-registering with the UDM entity based at least in part on the re-register request received in the downlink control plane message, wherein re-registering is performed in an idle state of the UE by triggering a mobility registration update.

8. A method for wireless communication by one or more network entities in a network, the method comprising:
  generating updated configuration information corresponding to a unified data management (UDM) entity for use at a user equipment, wherein the updated configuration information corresponding to the UDM entity includes a routing ID for the UDM entity;
  transmitting a container intended for the UE, wherein the container includes the updated configuration information corresponding to the UDM entity;
  receiving an acknowledgement message from the UE, acknowledging reception of the updated configuration information corresponding to the UDM entity; and
  receiving a message including an identifier generated based, at least in part, on the updated configuration information, wherein the identifier includes a subscription concealed identifier (SUCI), wherein the SUCI includes the routing ID for the UDM entity transmitted in the updated configuration information.

9. The method of claim 8, wherein the updated configuration information corresponding to the UDM entity further includes at least one of a home network public key, a home network public key identifier (ID), or a protection scheme ID.

10. The method of claim 8, wherein the container is encapsulated in a downlink non-access stratum transport message.

11. The method of claim 8, wherein the container includes information requesting the UE to transmit the acknowledgement message.

12. The method of claim 8, wherein the acknowledgement message is received in container encapsulated in an uplink non-access stratum transport message.

13. The method of claim 8, wherein the container includes a request for the UE to re-register with the UDM entity corresponding to the updated configuration information transmitted in the container; and
  further comprising performing a registration procedure with the UE based at least in part on the request for the UE to re-register.

14. An apparatus for wireless communication in a network by a user equipment (UE), comprising:
  at least one processor configured to:
    receive, from a network entity, a downlink control plane message including updated configuration information for a Unified Data Management (UDM) entity in the network, wherein the updated configuration information includes a routing ID for the UDM entity;
    based at least in part on whether a universal subscriber identification module (USIM) of the UE supports one or more parameters stored in the USIM to be updated, store the received configuration information in at least one of:
      the USIM when the USIM supports the one or more parameters to be updated; or
      memory of the UE when the USIM does not support the one or more parameters to be updated;
    generate an identifier for the UE based at least in part on the stored updated configuration information, wherein the identifier includes a subscription concealed identifier (SUCI), wherein the SUCI includes the routing ID for the UDM entity received in the updated configuration information; and transmit, to the network node, at least one message using the generated identifier; and a memory coupled with the at least one processor.

15. The apparatus of claim 14, wherein the at least one processor is further configured to determine whether the downlink control plane message was provided by a Home Public Land Mobile Network (HPLMN) corresponding to the UE, wherein the storing is based at least in part on the determination of whether the downlink control plane message was provided by the HPLMN.

16. The apparatus of claim 14, wherein:
the updated configuration information further includes at least one of a home network public key, a home network public key identifier (ID), or a protection scheme ID.

17. The apparatus of claim 14, wherein the downlink control plane message comprises a downlink non-access stratum transport message.

18. The apparatus of claim 14, wherein:
the downlink control plane message includes information requesting the UE to transmit an acknowledgement message; and
the at least one processor is further configured to transmit an acknowledgement message acknowledging reception of the downlink control plane message based at least in part on the information requesting the UE to transmit an acknowledgement message, wherein the acknowledgement message is transmitted in an uplink non-access stratum transport message.

19. The apparatus of claim 14, wherein:
the downlink control plane message includes a request for the UE to re-register with the UDM entity corresponding to the updated configuration information received in the downlink control plane message; and
the at least one processor is further configured to re-register with the UDM entity based at least in part on the re-register request received in the downlink control plane message, wherein re-registering is performed in an idle state of the UE by triggering a mobility registration update.

20. An apparatus for wireless communication by one or more network entities in a network, the apparatus comprising:
at least one processor configured to:
generate updated configuration information corresponding to a unified data management (UDM) entity for use at a user equipment, wherein the updated configuration information corresponding to the UDM entity includes a routing ID for the UDM entity;
transmit a container intended for the UE, wherein the container includes the updated configuration information corresponding to the UDM entity;
receive an acknowledgement message from the UE, acknowledging reception of the updated configuration information corresponding to the UDM entity; and
receive a message including an identifier generated based, at least in part, on the updated configuration information, wherein the identifier includes a subscription concealed identifier (SUCI), wherein the SUCI includes the routing ID for the UDM entity transmitted in the updated configuration information; and
a memory coupled with the at least one processor.

21. The apparatus of claim 20, wherein the updated configuration information corresponding to the UDM entity further includes at least one of a home network public key, a home network public key identifier (ID), or a protection scheme ID.

22. The apparatus of claim 20, wherein the container is encapsulated in a downlink non-access stratum transport message.

23. The apparatus of claim 20, wherein the container includes information requesting the UE to transmit the acknowledgement message.

24. The apparatus of claim 20, wherein the acknowledgement message is received in container encapsulated in an uplink non-access stratum transport message.

25. The apparatus of claim 20, wherein:
the container includes a request for the UE to re-register with the UDM entity corresponding to the updated configuration information transmitted in the container; and
the at least one processor is further configured to perform a registration procedure with the UE based at least in part on the request for the UE to re-register.

26. A method for wireless communication, the method comprising:
by a user equipment:
receiving, from a network entity in a network, a Non-Access Stratum (NAS) transport message, the received NAS transport message including:
updated configuration information for a Unified Data Management (UDM) entity in the network, the updated configuration information for the UDM entity including a routing ID for the UDM entity; and
a request for the user equipment to transmit an acknowledgement message;
based at least in part on the request for the user equipment to transmit the acknowledgement message included in the received NAS transport message, transmitting an uplink Non-Access Stratum (NAS) transport message including an acknowledgment message;
storing the received updated configuration information for the UDM entity in a universal subscriber identification module (USIM) of the UE;
generating an identifier for the user equipment based at least in part on the received updated configuration information, the generated identifier including a subscription concealed identifier (SUCI), the SUCI including the routing ID for the UDM entity included in the received updated configuration information; and
transmitting, to a network entity in the network, at least one message using the generated identifier.

27. A method for wireless communication, the method comprising:
by a user equipment:
receiving, from a network entity in a network, a Non-Access Stratum (NAS) transport message, the received NAS transport message including:
updated configuration information for a Unified Data Management (UDM) entity in the network, the updated configuration information for the UDM entity including a routing ID for the UDM entity; and
a request for the user equipment to re-register with the UDM entity;
based at least in part on the request for the user equipment to re-register with the UDM entity included in the received NAS transport message, re-registering with the UDM entity, the re-registering performed in an idle state of the user equipment;

storing the received updated configuration information for the UDM entity in a universal subscriber identification module (USIM) of the UE;

generating an identifier for the user equipment based at least in part on the received updated configuration information, the generated identifier including a subscription concealed identifier (SUCI), the SUCI including the routing ID for the UDM entity included in the received updated configuration information; and transmitting, to a network entity in the network, at least one message using the generated identifier.

28. An apparatus for wireless communication, comprising:
at least one processor configured to:
receive, from a network entity in a network, a Non-Access Stratum (NAS) transport message, the received NAS transport message including:
updated configuration information for a Unified Data Management (UDM) entity in the network, the updated configuration information for the UDM entity including a routing ID for the UDM entity; and
a request for a user equipment to transmit an acknowledgement message;
based at least in part on the request for the user equipment to transmit the acknowledgement message included in the received NAS transport message, transmit an uplink Non-Access Stratum (NAS) transport message including an acknowledgment message;
store the received updated configuration information for the UDM entity in a universal subscriber identification module (USIM) of the UE;
generate an identifier for the user equipment based at least in part on the received updated configuration information, the generated identifier including a subscription concealed identifier (SUCI), the SUCI including the routing ID for the UDM entity included in the received updated configuration information; and
transmit, to a network entity in the network, at least one message using the generated identifier; and
a memory coupled with the at least one processor.

29. An apparatus for wireless communication, comprising:
at least one processor configured to:
receive, from a network entity in a network, a Non-Access Stratum (NAS) transport message, the received NAS transport message including:
updated configuration information for a Unified Data Management (UDM) entity in the network, the updated configuration information for the UDM entity including a routing ID for the UDM entity; and
a request for a user equipment to re-register with the UDM entity;
based at least in part on the request for the user equipment to re-register with the UDM entity included in the received NAS transport message, re-register with the UDM entity, the re-registering performed in an idle state of the user equipment;
store the received updated configuration information for the UDM entity in a universal subscriber identification module (USIM) of the UE;
generate an identifier for the user equipment based at least in part on the received updated configuration information, the generated identifier including a subscription concealed identifier (SUCI), the SUCI including the routing ID for the UDM entity included in the received updated configuration information; and
transmit, to a network entity in the network, at least one message using the generated identifier; and
a memory coupled with the at least one processor.

30. The method of claim 26, wherein the storing is based at least in part on a determination that the received NAS transport message was provided by a Home Public Land Mobile Network (HPLMN).

31. The method of claim 27, wherein the storing is based at least in part on a determination that the received NAS transport message was provided by a Home Public Land Mobile Network (HPLMN).

32. The apparatus of claim 28, wherein the at least one processor is further configured to store the received updated configuration information for the UDM entity in the universal subscriber USIM of the UE based at least in part on a determination that the received NAS transport message was provided by a Home Public Land Mobile Network (HPLMN).

33. The apparatus of claim 29, wherein the at least one processor is further configured to store the received updated configuration information for the UDM entity in the universal subscriber USIM of the UE based at least in part on a determination that the received NAS transport message was provided by a Home Public Land Mobile Network (HPLMN).

* * * * *